US012719852B2

(12) United States Patent
Khan et al.

(10) Patent No.: US 12,719,852 B2
(45) Date of Patent: Aug. 25, 2026

(54) SYSTEMS AND METHODS FOR ENHANCED CONTENT-BASED ROUTING WITH SIGNATURE-BASED AUTHENTICATION

(71) Applicant: Amazon Technologies, Inc., Seattle, WA (US)

(72) Inventors: Rayees Saleem Khan, Staines-Upon-Thames (GB); Erdem Durgut, London (GB); David Lindley Patient, Tonbridge (GB)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 19/045,203

(22) Filed: Feb. 4, 2025

(65) Prior Publication Data

US 2026/0230463 A1 Aug. 6, 2026

(51) Int. Cl.
*H04L 9/40* (2022.01)

(52) U.S. Cl.
CPC ...... *H04L 63/0823* (2013.01); *H04L 63/0236* (2013.01)

(58) Field of Classification Search
CPC ........................ H04L 63/0823; H04L 63/0236
See application file for complete search history.

(56) References Cited

U.S. PATENT DOCUMENTS 7,328,341 B1 * 2/2008 Eun ..................... G06F 21/6218 713/176
10,785,056 B1 * 9/2020 Mathur ............... G06F 9/45558
11,765,155 B1 * 9/2023 Srinivasan ................ G06F 8/65 713/156
12,132,722 B1 * 10/2024 Cignetti ................ H04L 63/108
12,549,592 B1 * 2/2026 Kampanakis ....... H04L 63/1441
2019/0057204 A1 * 2/2019 Marcovecchio ...... H04L 67/146
2024/0097918 A1 * 3/2024 Sharma ............... H04L 63/0823
2025/0175460 A1 * 5/2025 Ramaseshan ........... H04L 63/10
2026/0052176 A1 * 2/2026 Aneja ..................... H04L 67/02

* cited by examiner

*Primary Examiner* — Oleg Korsak
(74) *Attorney, Agent, or Firm* — Eversheds Sutherland (US) LLP

(57) ABSTRACT

Devices, systems, and methods for routing network requests using signature-based authentication may include receiving, by a load balancer, a network request including a destination uniform resource indicator (URI) and a signature header; verifying, by the load balancer, a certificate for a domain name of the destination URI; initiating, by the load balancer, a serverless instance based on the verifying; allocating, by the serverless instance, a region for the network request; copying, by the serverless instance, the signature header of the network request; retrieving, by the serverless instance, a first address for an intended destination address of the network request; resolving, by the serverless instance, the destination URI to the intended destination address, wherein the intended destination address is different than the first address; and sending, by the serverless instance, content of the network request and the signature header to the intended destination address without modifying the signature header.

20 Claims, 7 Drawing Sheets

702
HARDWARE PROCESSOR
724
INSTRUCTIONS

704
MAIN MEMORY
724
INSTRUCTIONS

706
STATIC MEMORY
724
INSTRUCTIONS

728
SENSORS

720
NETWORK INTERFACE

730
ANTENNA(S)

GRAPHICS DISPLAY DEVICE
710

INPUT DEVICE
712

UI NAVIGATION DEVICE
714

STORAGE DEVICE
716
MACHINE-READABLE MEDIUM
722
INSTRUCTIONS
724

SIGNAL GENERATION DEVICE
718

ROUTING MODULES
719

POWER DEVICE
732

708

OUTPUT CONTROLLER
734

726
COMMUNICATIONS NETWORK

SYSTEMS AND METHODS FOR ENHANCED CONTENT-BASED ROUTING WITH SIGNATURE-BASED AUTHENTICATION

BACKGROUND

Systems using signature-based authentication of network request messages require maintaining integrity of portions of the request message for authentication, but routing such messages often results in modifying the request messages. As a result, authentication of network request messages is undermined.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
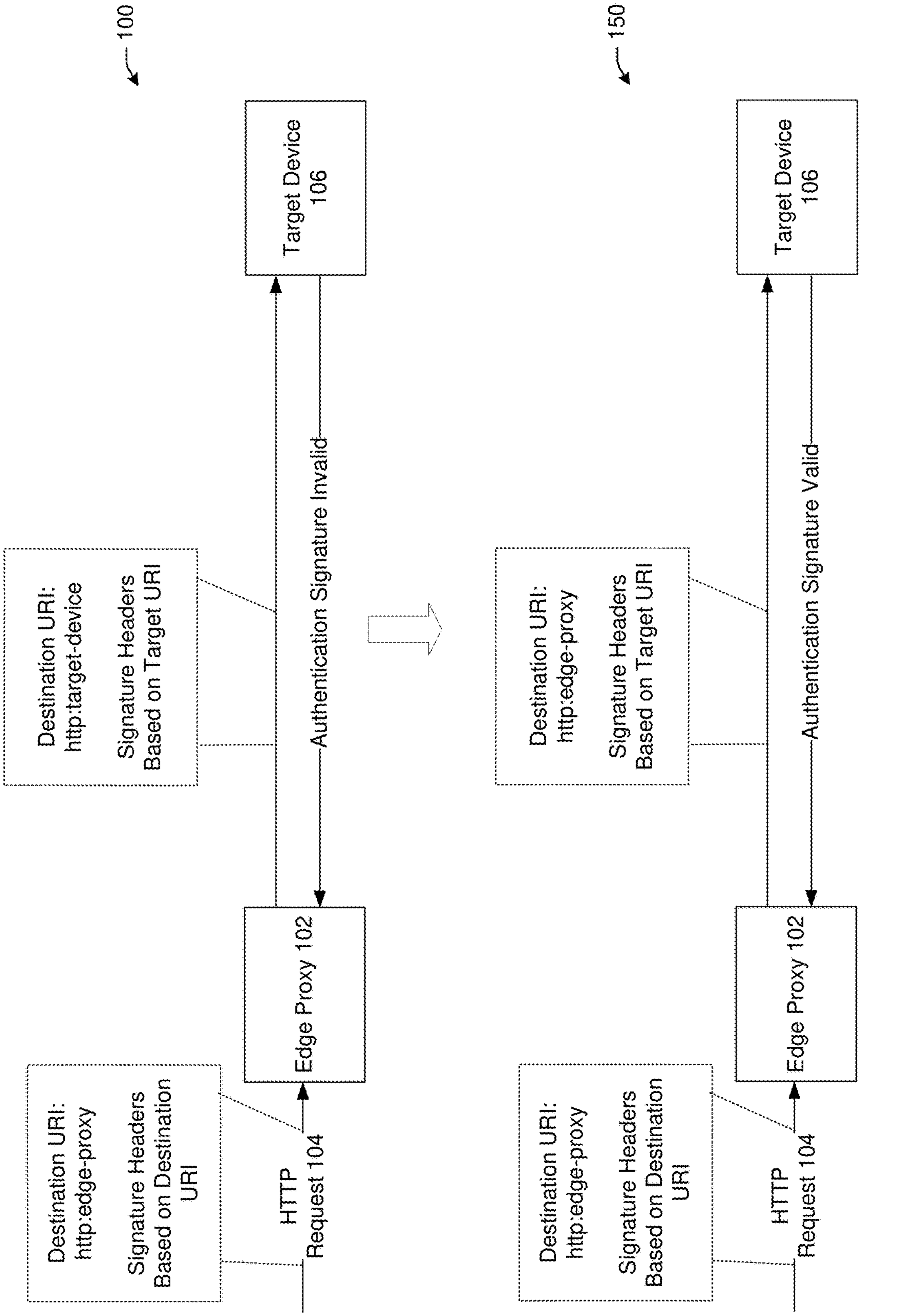
FIG. 1 illustrates example systems and processes for routing network requests using signature-based authentication in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced content-based routing with signature-based authentication.

In modern distributed systems, handling large volumes of requests (e.g., application programming interface calls) requires distributing requests across multiple servers for scalability and resiliency. Some methods often involve stateful proxies at a network edge to authenticate incoming requests and implement separate authentication mechanisms between the edge proxy and network nodes. However, such solutions may introduce complexity, latency, and cost.

One approach may use a lightweight stateless proxy at the edge to distribute traffic among multiple servers based on content of the request. However, for systems using signature-based authentication (e.g., as described in Internet Engineering Task Force Request for Comments RFC 9421), there is a challenge in maintaining integrity of request headers and body content needed for authentication purposes. In particular, RFC 9421 defines message authentication, defining a detached HTTP message signature. HTTP permits intermediaries to modify messages in ways that result in a recipient receiving a message that is not equivalent to the originally sent message, which may result in authentication of the message failing.

The introduction of an edge proxy as an intermediary necessitates changes to a request before forwarding the request to servers, which may invalidate the signature used in a signature-based authentication. The message signature may be determined by a client using a shared secret between the client and server, for example, and HTTP headers, including the host header. Any alteration of the headers or the shared secret invalidates the signature and causes authentication of the message to fail.

A request header refers to a header in an HTTP request used to provide information about the context of the request. A header may define the host URI, the date and time of the request, optional white space headers, obsolete folder headers, cache control, and dictionaries. For example, RFC 9421 provides the following component values for header fields:

Host: www.example.com
Date: Tue, 20 Apr. 2021 02:07:56 GMT
X-OWS-Header: Leading and trailing whitespace.
X-Obs-Fold-Header: Obsolete
  line folding.
Cache-Control: max-age-60, must-revalidate
Example-Dict: a=1, b=2; x=1; y=2, c=(a b c)

As a result of altering the headers and/or shared secret, some techniques have multiple problematic options. One is to proxy the request to a target server after inspecting content and changing the host header, resulting in rejection of the request by the target server due to an invalid signature. Another option is to override the routing library function to bypass the use of the host header for routing messages to the target IP address, instead routing the request to a specified IP address obtained separately.

The present disclosure addresses the above issues by introducing a semi-stateful edge proxy, which may be stateful for HTTP requests and stateless for their authentication. The enhanced approach herein may include terminating an incoming request and inspecting its content to identify which target server to which to send the request (e.g., based on a preset IP address rather than the target URI in the request). Then, the enhanced approach herein may copy the authentication headers and content from the request (e.g., used for the authentication) and include them in the request to the target server to preserve the validity of the request signature's validity. The enhanced approach herein may override the library function to bypass use of the host header for routing messages to the target IP address, instead routing the request to the preset IP address obtained separately for the request.

Typically, when proxying requests across applications, libraries may be used to resolve the host header and route requests to the target server. The HTTP host header specifies the domain name that a client wants to access. The present disclosure overrides this behavior by sending the request to a specified IP address, achievable through a DNS (domain name server) override mechanism. One example solution uses an option from PyCurl (Python library for curl), and alternative approaches may include writing an adapter for the Python requests library. By controlling the destination IP address of the request, the application maintains the authenticity of authentication-related headers and signatures, including the host header. As a result, the request is authenticated at the destination in the same manner as it would been in a stateful proxy where authentication would have been handled at the edge.

In one or more embodiments, an HTTP request may be received by a DNS (e.g., a cloud-based DNS), which may resolve the destination URL in a header of the HTTP request to a region of multiple regions, each region including a load balancer to balance the distribution of packets across the multiple regions. When the request reaches the region, the load balancer may use an event-driven serverless function (e.g., lambda, elastic computing instance, or the like) to evaluate the content of the request to determine a pre-determined IP address to where the request is to be sent. In this manner, the enhanced techniques herein "cheat" the DNS mechanism to avoid changing the destination URL of the request header and instead send the content and header of packet to the pre-determined IP address so that the content and header may be used for authentication. As a result, the request content may be used to determine where (e.g., to which pre-determined IP address) to send the request for authentication without changing the destination address.

Without the enhanced techniques herein, for example, an HTTP request received by an edge proxy may include a destination URI for the edge proxy in the signature headers of the request. However, the edge proxy may change the destination URI to a target server location where the authentication of the request will fail because the destination URI of the target server does not match the destination URI for the edge proxy. One solution would be to use a stateful edge proxy to facilitate the authentication requests (e.g., the edge proxy may be authentication stateful). However, this is not feasible in many situations because of issues such as latency induced by the edge proxy or a limitation induced by implementation of the authentication mechanism. The enhanced techniques herein facilitate the routing of the requests to target servers based on content while keeping the edge proxy stately with regard to authentication. This leaves the following options: (1) proxy the request to the target server after inspecting the content and change the host header, resulting in the request being rejected by the target server for an invalid signature as described above, or (2) proxy the request without changing the host header, resulting in the request being routed back to the edge proxy in an endless loop.

The present disclosure solves the issues above may making the edge proxy semi-stateful in that it may be stateful in terms of the HTTP request, but stateless by authentication. This may be achieved by the following: (1) terminating an incoming HTTP request and inspecting its content to determine which target server the request belongs. (2) Copying all the authentication headers and content to the destination request without change (e.g., so that the signature for authentication remains valid). (3) Overriding the routing library function so that it does not use the host header for routing messages to a target IP address, but routes the request to a pre-determined IP address obtained separately. The pre-determined IP address may vary based on a variety of factors, such as originating or target location, type of content of the request, or the like.

Therefore, instead of resolving the host header of the HTTP request and modifying the destination URL, the request is sent to the pre-determined IP address. This overriding of host header resolving may be achieved using a DNS override mechanism in which a library controls the destination IP address of the request rather than the destination address in the request header. By controlling the destination IP address of the request, an application may maintain the authentication-related headers and signatures of the request unmodified along with host headers so that the request may be properly authenticated in the same manner as it would have using a stateful proxy in which authentication was performed by the edge proxy.

Illustrative Processes and Use Cases

FIG. 1 illustrates example systems and processes for routing network requests using signature-based authentication in accordance with one or more embodiments of the present disclosure.

Referring to FIG. 1, a routing process 100 may include an edge proxy 102 receiving an HTTP request 104 whose destination URI is the address of the edge proxy 102 (e.g., http: edge-proxy) and whose signature headers based on a destination URI in the signature headers of the HTTP request 104. The edge proxy 102 may resolve the destination URI of the HTTP request 104 to a destination URI of a target device 106 (e.g., http: target-device), thereby modifying the destination URI of the edge proxy 102 that is signaled in the HTTP request 104. As a result, when the target device 106 attempts to authenticate the HTTP request 104 using the signature header that defines the destination URI of the target device 106, the authentication fails because the target device 106 URI is different than the destination URI for the edge proxy 102 that was included in the signature headers of the HTTP request 104.

Still referring to FIG. 1, a routing process 150 may resolve the authentication issue from the routing process 100. The edge proxy 102 may override the DNS resolution of the destination URI. In particular, the destination URI of the HTTP request 104 may be copied and provided along with the content of the HTTP request 104 to the target device 106, and because of the DNS override of the destination URI (e.g., using the intended destination address rather than the destination URI address according to DNS records), authentication of the HTTP request 104 by the target device 106 succeeds (e.g., because the destination URI in the authentication matches the destination URI in the signature headers of the HTTP request 104).

Figure 2:
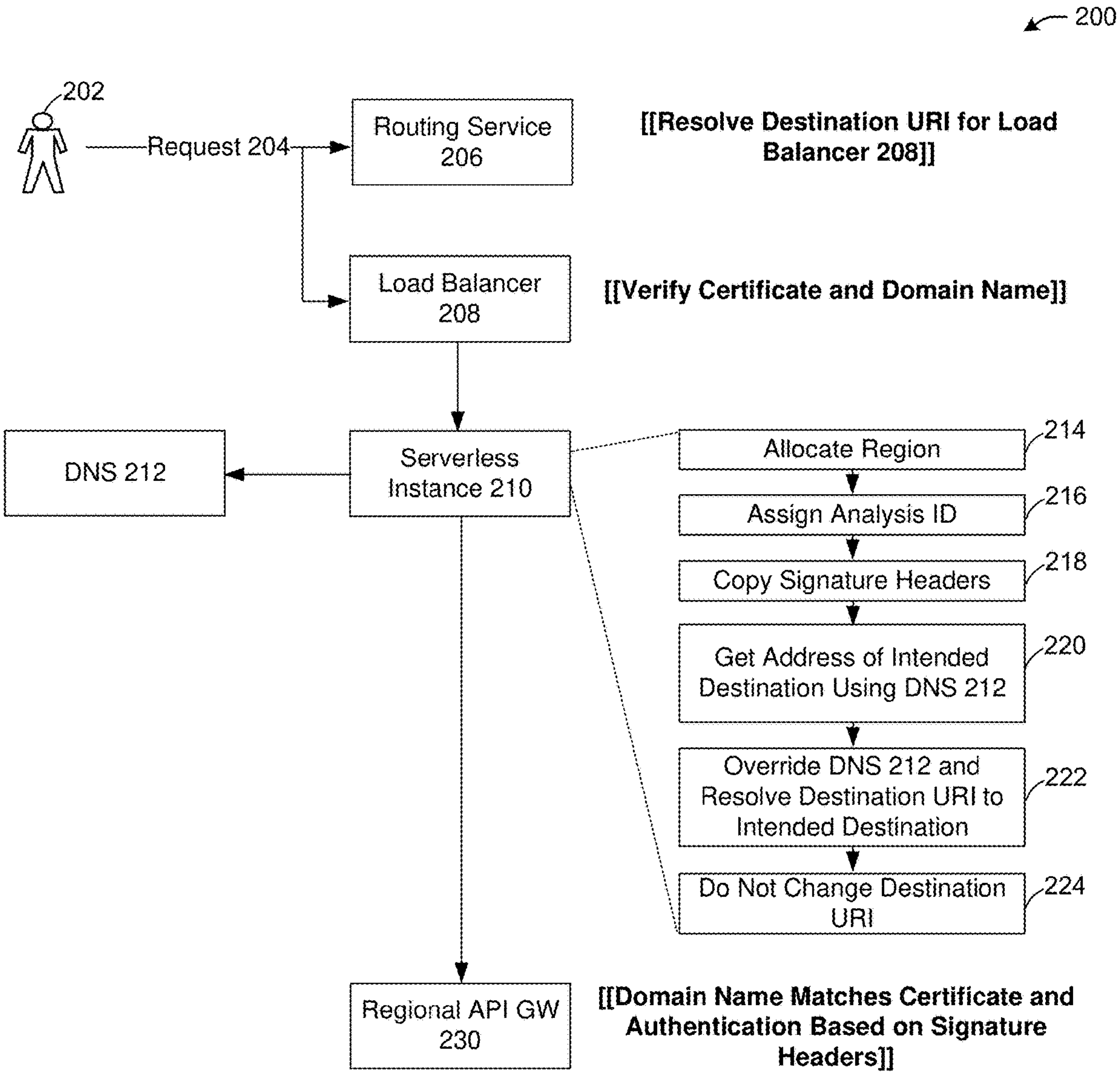
FIG. 2 illustrates an example architecture and process for content-based routing of network requests using signature-based authentication in accordance with one or more embodiments of the present disclosure.

FIG. 2 illustrates an example architecture and process 200 for content-based routing of network requests using signature-based authentication in accordance with one or more embodiments of the present disclosure.

Referring to FIG. 2, the architecture and process 200 may facilitate the routing process 150 of FIG. 1, for example. A user 202 makes an HTTP request 204, and a routing service 206 may resolve the destination URI of the HTTP request 204 to an IP address of a load balancer 208. The load balancer 208 receives the HTTP request 204, performs checks (e.g., verification) on a certificate for the domain name of the HTTP request 204 that was resolved to the load balancer 208. The HTTP request 204 triggers the load balancer 208 to invoke a serverless instance 210, which may analyze the content of the HTTP request 204 to identify a regional stack for the HTTP request 204 (e.g., using a DNS 212). For example, the serverless instance 210 may allocate a region for the HTTP request 204 at block 214, may assign an analysis ID to the HTTP request 204 at block 216, may copy the signature headers of the HTTP request 204 at block 218, may retrieve an address of an API gateway (GW) destination (e.g., an intended destination address selected from among multiple possible destination addresses) using the DNS 212 at block 220, may override the DNS 212 at block 222 to resolve the destination URI to the intended destination address (e.g., different than the DNS records for the destination URI), and may not change the destination URI at block 224 so that the signature headers of the HTTP request 204 remain valid. The serverless instance 210 may provide the signature headers and content of the HTTP request 204 with the request to the regional API GW 230, along with the certificate. As a result, the regional API GW 230 may perform authentication of the user 202 based on the signature headers and content. The authentication passes because the certificates from the load balancer 208 and the regional API GW 230 share the same domain and the signature headers are copied from the HTTP request 204 without modification.

Figure 3:
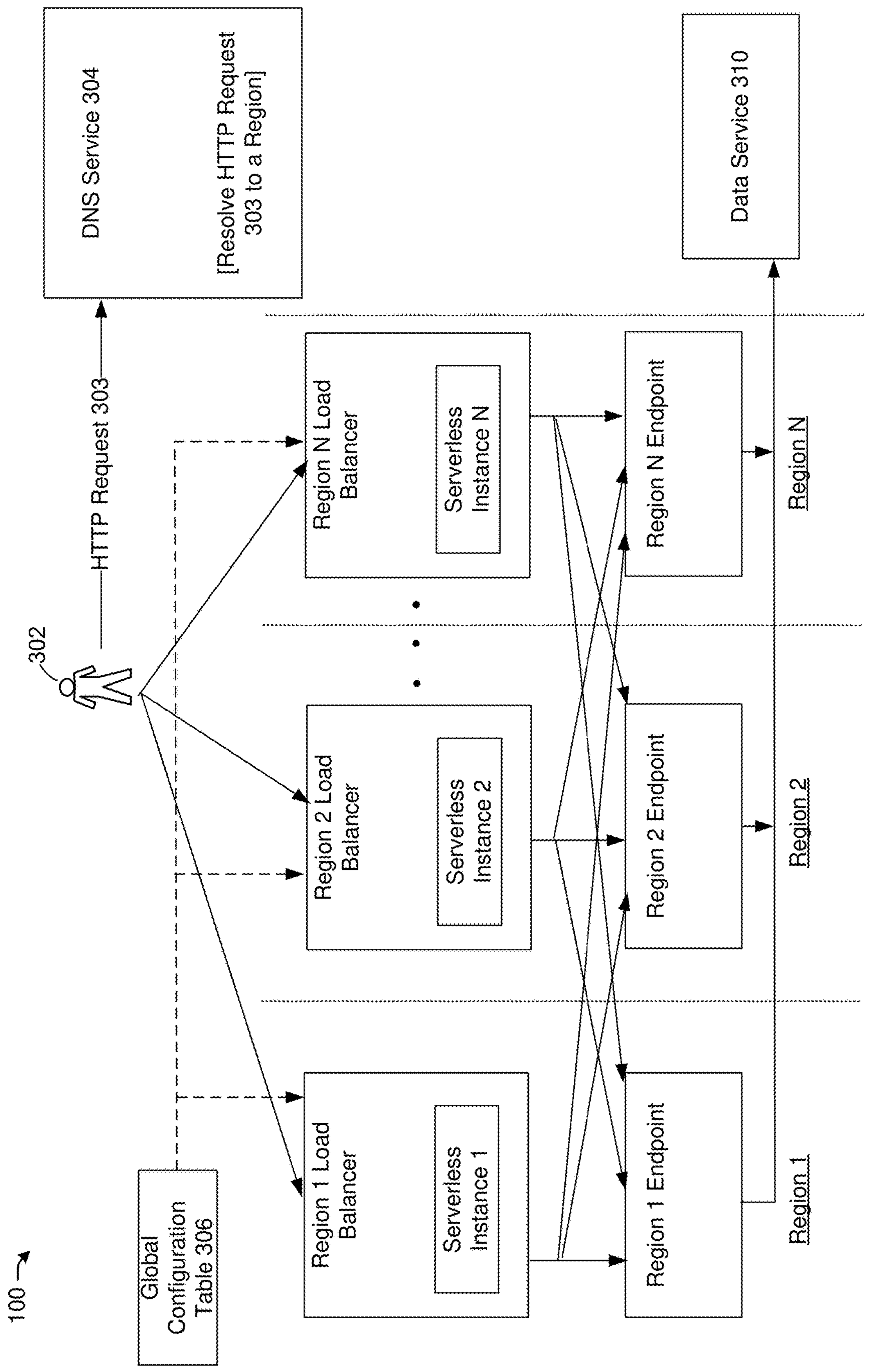
FIG. 3 illustrates an example multi-region support process for content-based routing of network requests using signature-based authentication in accordance with one or more embodiments of the present disclosure.

FIG. 3 illustrates an example multi-region support process 300 for content-based routing of network requests using signature-based authentication in accordance with one or more embodiments of the present disclosure.

Referring to FIG. 3, a user 302 makes an HTTP request 303, resulting in a DNS query to a DNS service 304. The DNS service 304 resolves the HTTP request 303 to a region (e.g., based on one or more rules associated with location, content, load balancing, and the like). Once the HTTP request 303 is resolved to a region (e.g., among Region 1, Region 2, . . . , Region N), the HTTP request 303 is routed to the respective region. In particular, each region may include a respective load balancer 1-N. As described above with respect to FIG. 2, the regional load balancer may invoke a serverless instance (e.g., 1-N) to access the content of the HTTP request 303 for analysis in determining where to route the HTTP request 303. The regional load balancer may route the HTTP request 303 to any of the regions (e.g., regional endpoints 1-N), each of which may include back-end services and may document the HTTP request 303 with a data service 310.

The logic for routing the HTTP request 303 among the regions 1-N may be defined by an entry in a configuration storage, such as an AppConfig (e.g., a node.js library, command line interface application, and related standards) or other config storage, which may be available in all regions so that the HTTP request 303 may be processed in any of the regions 1-N.

The load balancer may enable routing based on location, source IP address, resource availability, health status, and content-related criteria such as content type, content properties, etc. Examples of content-related criteria for a streaming video-related HTTP request are described with respect to FIG. 5.

Figure 4:
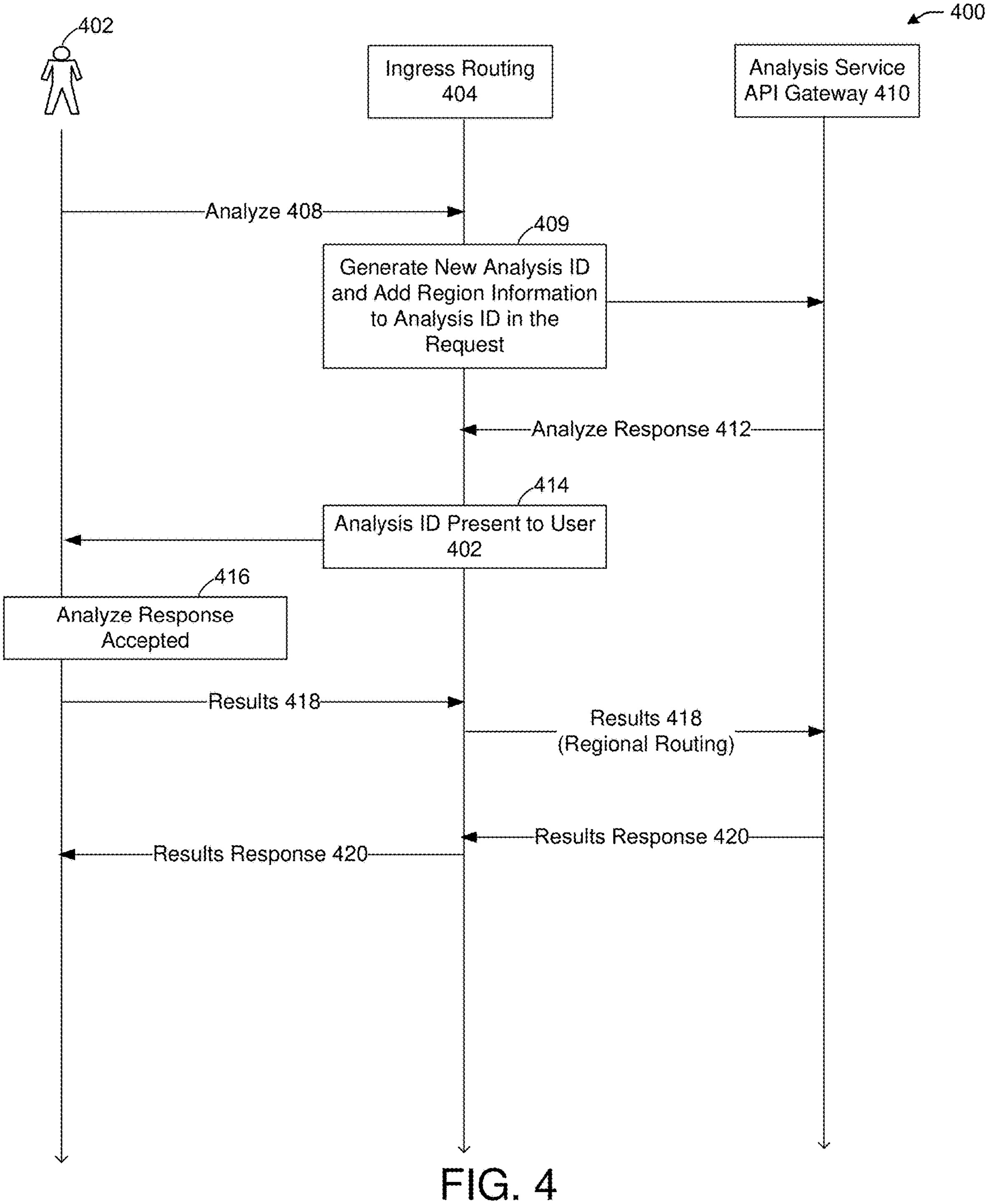
FIG. 4 is an example flow for a process for allocating an analysis identifier for a request in content-based routing of network requests using signature-based authentication in accordance with one or more embodiments of the present disclosure.

FIG. 4 is an example flow for a process 400 for allocating an analysis identifier for a request in content-based routing of network requests using signature-based authentication in accordance with one or more embodiments of the present disclosure.

Referring to FIG. 4, a user 402 may make an HTTP request, and a corresponding analyze request 408 may be sent to an ingress routing 404 (e.g., the serverless instance 210 of FIG. 2, the serverless instances 1-N of FIG. 3) for allocation of an analysis ID. The ingress routing 404 may generate a new analysis ID and add it to the request along with region information added to the analysis ID at block 409. The request may be sent to an analysis service API GW 410 with the analysis ID (e.g., a random universally unique ID). An identity of a selected region for routing the request may be part of the analysis ID, for example. As a result, the region may be retrieved from the analysis ID, which the analysis service API GW 410 may send back to the user 402 in response 412 (e.g., an accepted response 416 presenting the analysis ID to the user 402 at block 414). The user 402 may request 418 results using the returned analysis ID, and the ingress routing 404 may route the request to the region based on the information from the analysis ID. The analysis service API GW 410 may provide a results response 420 to the request 418.

Figure 5:
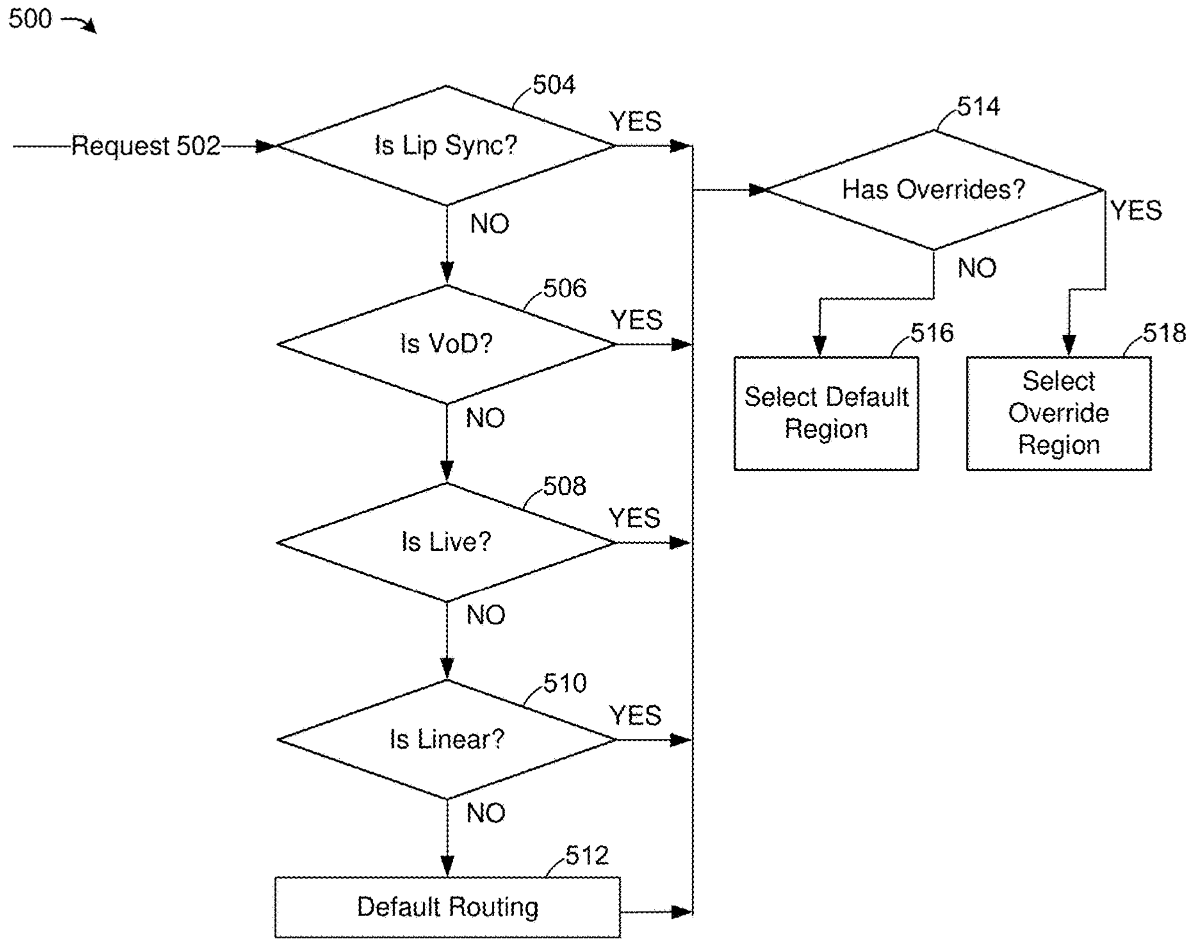
FIG. 5 is a flow for an example process for analyzing a request in content-based routing of network requests using signature-based authentication in accordance with one or more embodiments of the present disclosure.

FIG. 5 is a flow for an example process 500 for analyzing a request in content-based routing of network requests using signature-based authentication in accordance with one or more embodiments of the present disclosure. In FIG. 5, the request 502 is an HTTP request for video streaming, but other types of requests for different content may be processed similarly.

At block 504, the process 500 may determine whether the request 502 includes a lip sync defect. If not, the process 500 may determine whether the request 502 is of a user type video on demand (VOD) at block 506. If not, the process 500 may determine whether the request 502 includes a property type live events (e.g., is live) at block 508. If not, the process 500 may determine whether the request 502 includes a property type linear channels (e.g., is linear) at block 510. If not, then default routing may apply to the request 502 at block 512. It should be noted that any of blocks 504-510 may be used in any order, and not necessarily conditional on each other. When any of the blocks 504-510 are true, or when default routing is applied at block 512, the process 500 may determine whether there are any routing overrides at block 514. An override may take priority over the default routing. The message body of the request 502 may provide context for identifying any relevant overrides, such as for event types, channels/stations, region, and the like.

Figure 6:
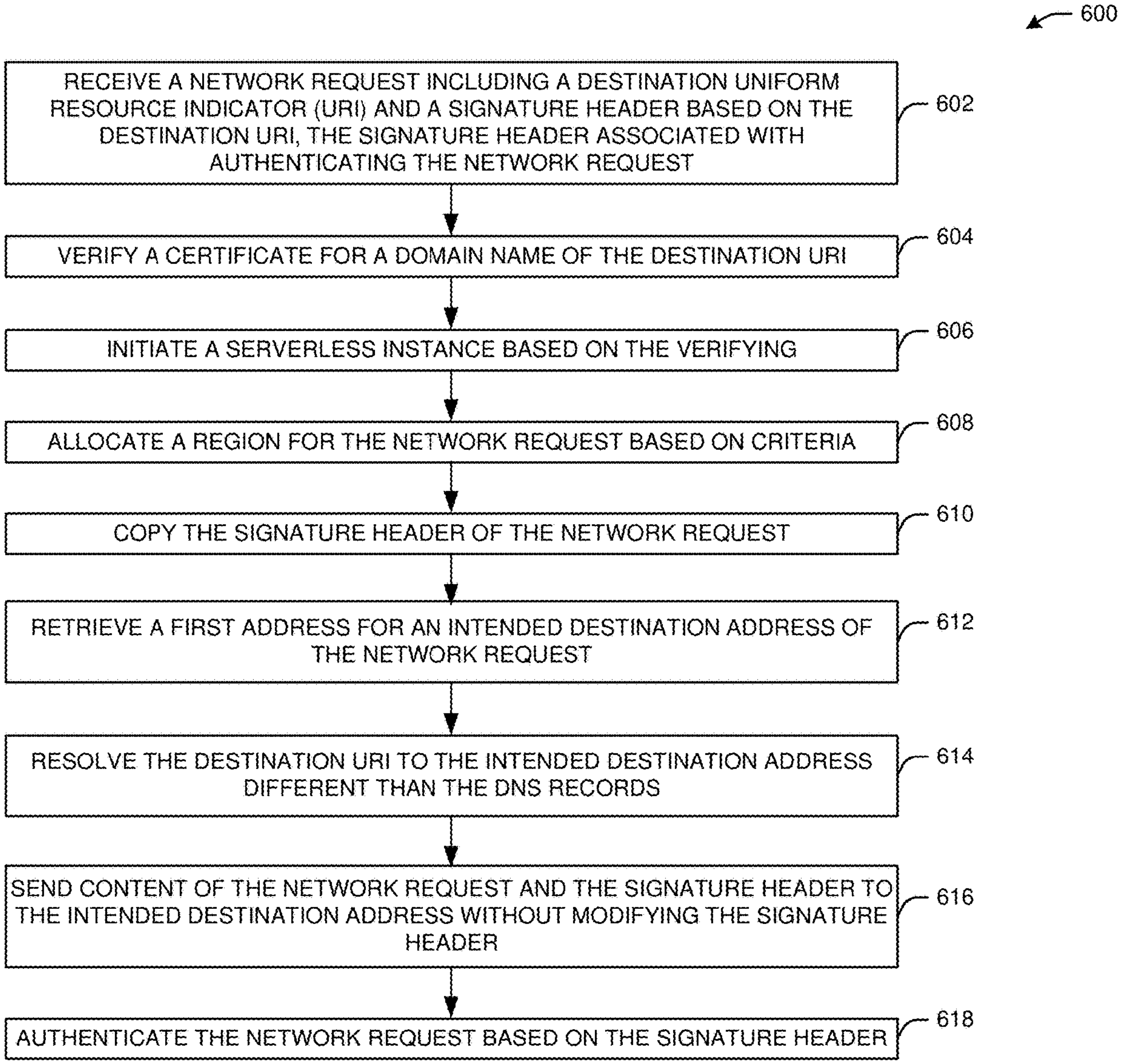
FIG. 6 is a flow chart for an example process for routing network requests using signature-based authentication in accordance with one or more embodiments of the present disclosure.

FIG. 6 is a flow chart for an example process 600 for routing network requests using signature-based authentication in accordance with one or more embodiments of the present disclosure.

At block 602, a device (e.g., the edge proxy 102 of FIG. 1, the load balancer 208 of FIG. 2, the regional load balancers of FIG. 3, the routing modules 719 of FIG. 7) may receive a network request that includes a destination URI and one or more signature headers based on the destination URI (e.g., used for authentication). The device may receive the request based on a DNS having resolved the destination URI to an address of the device.

At block 604, the device may verify a certificate of the domain name of the destination URI. The device may verify the certificate and the domain name.

At block 606, once the device has performed the verification, the device may initiate a serverless instance to perform multiple functions. For example, at block 608, the device may use the serverless instance to allocate a region for the network request based on criteria (e.g., origination location of the request, content of the request, type of the request, etc.), and at block 610 may copy the signature header(s) to include in the routing of the network request so that the signature header(s) are not modified and may facilitate proper authentication of the request. At block 612, the device may retrieve a first address for an intended destination address of the network request (e.g., using a DNS mechanism), however, may override the first address. To override the first address, at block 614, the serverless instance may resolve the destination URI to the intended destination address (e.g., which may be selected based on one or more criteria and different than the address of the DNS records).

At block 616, the device may send the content of the network request and the signature header(s) to the intended destination address without modifying the signature header(s) so that they may be used for authentication of the request. At block 618, a device at the intended destination address may authenticate the network request based on the signature header(s) because the destination URI was unchanged from the initial request.

These examples are not meant to be limiting.

Figure 7:
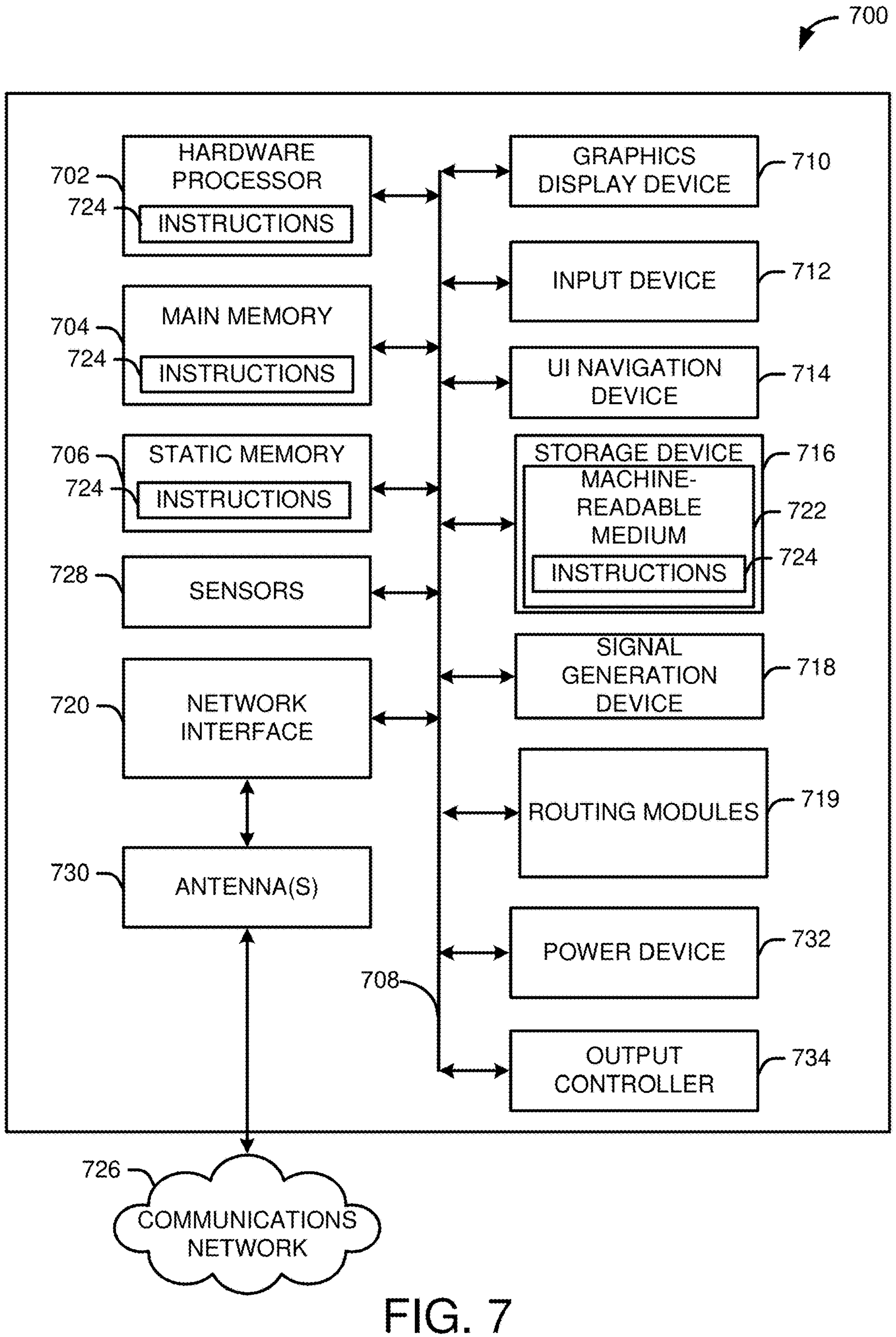
FIG. 7 is a block diagram illustrating an example computer system in accordance with one or more embodiments of the present disclosure.

FIG. 7 illustrates a block diagram of an example machine upon which any of one or more techniques (e.g., methods) may be performed, in accordance with one or more example embodiments of the present disclosure.

In other embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 700 (e.g., computer system) may include a hardware processor 702 (e.g., a central processing unit (CPU), a graphics processing unit (GPU), a hardware processor core, a tensor processing unit (TPU), or any combination thereof), a main memory 704 and a static memory 706, some or all of which may communicate with each other via an interlink (e.g., bus 708). The machine 700 may further include a power device 732, a graphics display device 710, an input device 712 (e.g., a keyboard), and a user interface UI navigation device 714 (e.g., a mouse). In an example, the graphics display device 710, input device 712, and UI navigation device 714 may be a touch screen display. The machine 700 may additionally include a storage device 716, a signal generation device 718, one or more routing modules 719 (e.g., representing any of the edge proxy 102 and/or the target device 106 of FIG. 1, the load balancer 208, the serverless instance 210, and/or the regional API GW 230 of FIG. 2, the DNS service 304 and/or the regional load balancers and endpoints of FIG. 3, the ingress routing 404 and/or the analysis service API gateway 410 of FIG. 4, and capable of performing the processes of FIGS. 5 and 6), and a network interface 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass.

Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 720 may include one or more physical jacks (e.g., Ethernet, coaxial, or phone jacks) or one or more antennas to connect to the communications network 726. The term “transmission medium” shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word “exemplary” is used herein to mean “serving as an example, instance, or illustration.” Any embodiment described herein as “exemplary” is not necessarily to be construed as preferred or advantageous over other embodiments.

As used herein, unless otherwise specified, the use of the ordinal adjectives “first,” “second,” “third,” etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to an object with a type, associated data, a set of methods that operate on it, and, if applicable, relationships to other resources. Additionally or alternatively, the term "compute resource" or "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and the like. The term "network resource" or "communication resource" at least in some examples refers to resources that are accessible by computer devices/systems via a communications network. The term "system resources" at least in some examples refers to any kind of shared entities to provide services, and includes computing and/or network resources. System resources may be considered as a set of coherent functions, network data objects or services, accessible through a server where such system resources reside on a single host or multiple hosts and are clearly identifiable.

The term "cloud service provider" or "CSP" at least in some examples refers to an organization that operates or otherwise provides cloud resources including, for example, centralized, regional, and/or edge data centers and/or the like. In some examples, the term "cloud computing" refers to computing resources and services offered by a CSP.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The terms "instantiate," "instantiation," and the like at least in some examples refers to the creation of an instance. In some examples, an "instance" also at least in some examples refers to a concrete occurrence of an object, which may occur, for example, during execution of program code.

The term "edge computing" at least in some examples refers to an implementation or arrangement of distributed computing elements that move processing activities and resources (e.g., compute, storage, acceleration, and/or network resources) towards the "edge" of the network in an effort to reduce latency and increase throughput for endpoint users (client devices, user equipment, and the like). Additionally or alternatively, term "edge computing" at least in some examples refers to a set of services hosted relatively close to a client/UE's access point of attachment to a network to achieve relatively efficient service delivery through reduced end-to-end latency and/or load on the transport network. In some examples, edge computing implementations involve the offering of services and/or resources in a cloud-like systems, functions, applications, and subsystems, from one or multiple locations accessible via wireless networks. Additionally or alternatively, term "edge computing" at least in some examples refers to the concept that enables operator and 3rd party services to be hosted close to a UE's access point of attachment, to achieve an efficient service delivery through the reduced end-to-end latency and load on the transport network.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network, however, references to an "edge computing system" generally refer to a distributed architecture, organization, or collection of multiple nodes and devices, and which is organized to accomplish or offer some aspect of services or resources in an edge computing setting.

The term "edge computing platform" or "edge platform" at least in some examples refers to a collection of functionality that is used to instantiate, execute, or run edge applications on a specific edge compute node (e.g., virtualization infrastructure and/or the like), enable such edge applications to provide and/or consume edge services, and/or otherwise provide one or more edge services.

The term "edge application" or "edge app" at least in some examples refers to an application that can be instantiated on, or executed by, an edge compute node within an edge computing network, system, or framework, and can potentially provide and/or consume edge computing services.

The term "edge service" at least in some examples refers to a service provided via an edge compute node and/or edge platform, either by the edge platform itself and/or by an edge application.

The term "workload" at least in some examples refers to an amount of work performed by a computing system, device, entity, and the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and the like), and/or the like. Various algorithms may be used to determine a workload and/or workload characteristics, which may be based on any of the aforementioned workload types.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components.

The term "network address" at least in some examples refers to an identifier for a node or host in a computer network, and may be a unique identifier across a network and/or may be unique to a locally administered portion of the network. Examples of identifiers and/or network addresses can include am application identifier, Bluetooth hardware device address (BD_ADDR), a cellular network address (e.g., Absolute Radio-Frequency Channel Number (ARFCN), Access Point Name (APN), AMF name and/or AMF identifier (ID), AF-Service-Identifier, Cell Global Identifier (CGI) (e.g., NR CGI (NCGI), CGI NG-RAN, CGI EUTRA, and/or the like), Closed Access Group Identifier (CAG-ID), Edge Application Server (EAS) ID, Data Network Access Identifier (DNAI), Data Network Name (DNN), Evolved Cell Global Identifier (ECGI), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, gNB Identifier (gNB ID), Global gNB ID, International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Local NG-RAN Node Identifier, Mobile Subscriber Identification Number (MSIN), Mobile Subscriber/Station ISDN Number (MSISDN), Network identifier (NID), Network Slice Instance (NSI) ID, Network Slice AS Group (NSAG), Permanent Equipment Identifier (PEI), Public Land Mobile Network (PLMN) identity (ID), Physical Cell Identifier (PCI), QoS Flow ID (QFI) and/or 5G QoS Identifier (5QI), RAN ID, Routing Indicator, Radio Network Temporary Identifier (RNTI) and variants thereof, SMS Function (SMSF) ID, Stand-alone Non-Public Network (SNPN) ID, Single Network Slice Selection Assistance information (S-NSSAI), sidelink identities (e.g., Source Layer-2 ID, Destination Layer-2 ID, PC5 Link Identifier, and the like), Subscription Concealed Identifier (SUCI), Subscription Permanent Identifier (SUPI), Temporary Mobile Subscriber Identity (TMSI) and variants thereof, Tracking Area identity (TAI), UE Access Category and Identity, and/or other cellular network related identifiers), CAG-ID, driver's license number, Global Trade Item Number (GTIN) (e.g., Australian Product Number (APN), EPC, European Article Number (EAN), Universal Product Code (UPC), and the like), email address, Enterprise Application Server (EAS) ID, an endpoint address, an Electronic Product Code (EPC) as defined by the EPCglobal Tag Data Standard, Fully Qualified Domain Name (FQDN), flow ID and/or flow hash, hash value, index, internet protocol (IP) address in an IP network (e.g., IP version 4 (IPv4), IP version 6 (IPv6), and the like), an internet packet exchange (IPX) address, LAN ID, a MAC address, personal area network (PAN) ID, port number (e.g., TCP port number, UDP port number, and the like), price lookup code (PLC), product key, QUIC connection ID, RFID tag, sequence number, service set identifier (SSID) and variants thereof, screen name, serial number, stock keeping unit (SKU), socket address, social security number (SSN), telephone number (e.g., in a public switched telephone network (PTSN)), unique identifier (UID) (e.g., including globally UID, universally unique identifier (UUID), and the like), a Universal Resource Locator (URL) and/or Universal Resource Identifier (URI), user name (e.g., ID for logging into a service provider platform, such as a social network and/or some other service), vehicle identification number (VIN), Virtual LAN (VLAN) ID, X.21 address, an X.25 address, Zigbee® ID, Zigbee® Device Network ID, and/or any other suitable network address and components thereof.

The term "universally unique identifier" or "UUID" at least in some examples refers to a number used to identify information in computer systems. In some examples, a UUID includes 128-bit numbers and/or are represented as 32 hexadecimal digits displayed in five groups separated by hyphens in the following format: "xxxxxxxx-xxxx-Mxxx-Nxxx-xxxxxxxxxxxx" where the four-bit M and the 1 to 3 bit N fields code the format of the UUID itself. Additionally or alternatively, the term "universally unique identifier" or "UUID" at least in some examples refers to a "globally unique identifier" and/or a "GUID". The term "endpoint address" at least in some examples refers to an address used to determine the host/authority part of a target URI, where the target URI is used to access an NF service (e.g., to invoke service operations) of an NF service producer or for notifications to an NF service consumer.

The term "authentication" at least in some embodiments refers to a process of proving or verifying an identity. Additionally or alternatively, the term "authentication" at least in some embodiments refers to a mechanism by which a computer system checks or verifies that a user or entity is really the user or entity being claimed. Examples of the authentication and/or authorization techniques include using API keys, basic access authentication ("Basic Auth"), Open Authorization (OAuth), hash-based message authentication codes (HMAC), Kerberos protocol, OpenID, WebID, and/or other authentication and/or authorization techniques.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A method for routing network packets using signature-based authentication:

receiving, by a domain name system (DNS), a Hypertext Transfer Protocol (HTTP) request comprising a destination uniform resource indicator (URI) for a global endpoint for a multi-region service and a Request for Comments (RFC) 9421 signature header based on the destination URI;

resolving, by the DNS, the destination URI to a URI of a region-based load balancer;

receiving, by the region-based load balancer, the HTTP request based on the resolving;

verifying, by the region-based load balancer, a certificate for a domain name of the destination URI;

initiating, by the region-based load balancer, a serverless instance based on the verifying;

allocating, by the serverless instance, a region for the HTTP request;

copying, by the serverless instance, the signature header of the HTTP request;

retrieving, by the serverless instance, using the DNS, a first address for an intended destination address of the region;

resolving, by the serverless instance, the destination URI to the intended destination address, wherein the intended destination address is different than DNS records for the destination URI;

sending, by the serverless instance, content of the HTTP request and the signature header to the intended destination address without modifying the signature header; and authenticating, by a device at the second address, the HTTP request based on the signature header.

2. The method of claim 1, further comprising:

generating, by the serverless instance, an analysis identifier for the HTTP request;

adding, by the serverless instance, region information for the HTTP request to the analysis identifier; and sending, by the serverless instance, the analysis identifier and the region information to the intended destination address.

3. The method of claim 1, further comprising:

verifying, by the device at the intended destination address, the certificate.

4. The method of claim 1, further comprising:

identifying the intended destination address based on a type of the HTTP request.

5. A method for routing network packets using signature-based authentication:

receiving, by a load balancer, a network request comprising a destination uniform resource indicator (URI) and a signature header based on the destination URI, wherein the signature header is associated with authenticating the network request;

verifying, by the load balancer, a certificate for a domain name of the destination URI;

initiating, by the load balancer, a serverless instance based on the verifying;

allocating, by the serverless instance, a region for the network request;

copying, by the serverless instance, the signature header of the network request;

retrieving, by the serverless instance, a first address for an intended destination address of the region;

resolving, by the serverless instance, the destination URI to the intended destination address, wherein the intended destination address is different than DNS records; and sending, by the serverless instance, content of the network request and the signature header to the intended destination address without modifying the signature header.

6. The method of claim 5, further comprising:

authenticating, by a device at the intended destination address, the network request based on the signature header.

7. The method of claim 5, wherein the network request is a Hypertext Transfer Protocol (HTTP) request, and wherein the signature header is a Request for Comments (RFC) 9421 signature header.

8. The method of claim 5, further comprising:

generating, by the serverless instance, an analysis identifier for the network request;

adding, by the serverless instance, region information for the network request to the analysis identifier; and sending, by the serverless instance, the analysis identifier and the region information to the intended destination address.

9. The method of claim 5, further comprising:

verifying, by a device at the intended destination address, the certificate.

10. The method of claim 5, further comprising:

identifying the intended destination address based on a type of the network request.

11. The method of claim 5, further comprising:

identifying the intended destination address based on the content of the network request.

12. The method of claim 5, further comprising:

identifying the intended destination address based on a location from where the network request originated.

13. The method of claim 5, further comprising:

determining, by the serverless instance, that a routing override applies to the network request, wherein sending the content of the network request and the signature header to the intended destination address is based on the routing override.

14. A system for routing network packets using signature-based authentication comprises:

a global endpoint for a multi-region service; and load balancers for respective regions of the multi-region service, wherein a first load balancer is configured to:

receive, from the global endpoint, a network request comprising a destination uniform resource indicator (URI) and a signature header based on the destination URI, wherein the signature header is associated with authenticating the network request;

verify a certificate for a domain name of the destination URI;

initiate a serverless instance based on the verifying;

allocate, using the serverless instance, a region for the network request;

copy, using the serverless instance, the signature header of the network request;

retrieve, using the serverless instance, a first address for an intended destination address of the region;

resolve, using the serverless instance, the destination URI to the intended destination address, wherein the intended destination address is different than DNS records; and send, using the serverless instance, content of the network request and the signature header to the intended destination address without modifying the signature header.

15. The system of claim 14, further comprising a device at the intended destination address, wherein the device at the second address is configured to:

authenticate the network request based on the signature header.

16. The system of claim 14, wherein the network request is a Hypertext Transfer Protocol (HTTP) request, and wherein the signature header is a Request for Comments (RFC) 9421 signature header.

17. The system of claim 14, wherein the first load balancer is further configured to:

generate, using the serverless instance, an analysis identifier for the network request;

add, using the serverless instance, region information for the network request to the analysis identifier; and send, using the serverless instance, the analysis identifier and the region information to the intended destination address.

18. The system of claim 14, wherein the first load balancer is further configured to:

identify the intended destination address based on at a type of the network request.

19. The system of claim 14, wherein the first load balancer is further configured to:

identify the intended destination address based on the content of the network request.

20. The system of claim 14, wherein the first load balancer is further configured to:

determine, using the serverless instance, that a routing override applies to the network request, wherein to send the content of the network request and the signature header to the intended destination address is based on the routing override.

* * * * *